United States Patent [19]

Dischert et al.

[11] Patent Number: 4,589,019
[45] Date of Patent: May 13, 1986

[54] DIGITAL ADDER INCLUDING COUNTER COUPLED TO INDIVIDUAL BITS OF THE INPUT

[75] Inventors: Robert A. Dischert, Burlington, N.J.; Robert J. Topper, Rockledge, Pa.

[73] Assignee: RCA Corporation, Princeton, N.J.

[21] Appl. No.: 487,862

[22] Filed: Apr. 22, 1983

[51] Int. Cl.[4] .................... H04N 5/14; H04N 5/202
[52] U.S. Cl. ..................................... 358/160; 358/32; 358/164; 358/168; 358/169; 364/575; 377/37; 382/52
[58] Field of Search ............... 358/160, 161, 162, 163, 358/164, 168, 169, 32; 364/575, 734; 377/19, 37, 49; 382/52

[56] References Cited

U.S. PATENT DOCUMENTS 4,199,817  4/1980  Conkling et al. ................ 364/575
4,489,349  12/1984  Okada ................................ 358/32
4,499,494  2/1985  Dischert et al. .................. 358/32

*Primary Examiner*—James J. Groody
*Assistant Examiner*—Michael D. Parker
*Attorney, Agent, or Firm*—William H. Meise; Eugene M. Whitacre; Lawrence C. Edelman

[57] ABSTRACT

An adder circuit is described for producing signals representative of the sum of large numbers of block-synchronized digital signals each of which may have any value within the range of quantizing levels represented. The adder circuit includes one or more binary counters coupled to count bits of the input signal having a particular significance. Counting takes place during an active interval such as a television field interval, and the counters are reset after each counting interval. The counter outputs are latched either before or after processing by addition of other counter outputs. The latched signal represents the sum of the values of the words in one sync block.

20 Claims, 8 Drawing Figures

DIGITAL ADDER INCLUDING COUNTER COUPLED TO INDIVIDUAL BITS OF THE INPUT

This invention relates to digital adding means, and particularly to digital adding means adapted for adding large numbers of digital words over a definite time interval, which is particuarly useful for summing the values of digital television video signals for forming an average value as for determining average picture level.

BACKGROUND OF THE INVENTION

Television cameras include lenses which focus images onto television imagers. The imagers respond to the light falling thereupon to produce time-sequential signals derived by recurrent raster scanning of the light-sensitive surface of the imagers. These time-sequential signals are intended to accurately represent the light produced by the image in the form of amplitude variations, with black levels typically being represented by zero signal, white levels by a positive voltage (although other connections may be used). The electrical signals generated by an imager such as a vidicon may not be linearly related to the amount of light falling thereupon, and television image reproducing devices such as kinescopes (picture tubes) do not linearly transduce the amount of video signals applied thereto into light, so nonlinear compensation is applied to the signals produced by a video signal source such as a camera, and this compensation is known as gamma (γ) correction.

There are other conditions which result in production of video signals which do not accurately represent the illumination of the image. The condition known as flare results from internal dispersion of light within the lens, optical system and in the nominally black support structures for the lens, optical system and imager. This dispersion results from light which either enters the lens system at angles which do not result in the formation of an image focussed onto the imager or which enter at the proper angle and are dispersed by internal surfaces so as to impinge upon the nominally black (light-absorptive) support surfaces. However, these black surfaces do not completely absorb light, but re-reflect certain portions, with the result that a certain part of the ambient light suffuses the entire light-sensitive portion of the imager. Since this suffusing light is not focussed, it does not form a defined image but merely adds a certain amount of light to all points of the image. This shows up in the resulting signal as an apparent shift of the black-level towards white. The amount of light suffusing the surface of the imager depends upon the ambient light levels, and consequently the apparent black level changes in response to ambient light level.

In cameras using vidicon tubes and analog circuits, correction for the effect is accomplished by operating on the video signal produced by the camera. The operation consists of subtracting from the signal amplitude a predetermined amount which depends upon the average picture level (APL), which is assumed to be representative of the overall illumination of the scene and therefore representative of the signal offset attributable to flare. In an analog circuit, APL is simply established by an integrator coupled to the signal path. The integrator may be of the simple resistance-capacitance (RC) type or may be more sophisticated. Analog integrators have a response which is notoriously well known, one measure of which is the time constant (TC). An analog integrator may be made to have a TC which is long compared with a field or frame interval, whereupon it averages the signal values of the picture elements (pixels) of the current frame with a weighted average of the values of pixels of preceding frames (this latter weighting results from the discharge TC of the integrator which decreases the relative importance of signals applied in the relatively distant past).

Digital video signal processing is becoming more important because of the ability of digital circuits to perform signal processing functions more exactly than can their analog counterparts. Thus, functions requiring great exactitude are performed digitally. Notably, time-base correction in television video playback arrangements is almost universally performed digitally in high-quality equipment because the required signal delay function cannot be performed accurately by analog delays. Generally, it is desirable for accurate signal processing to perform a digital-to-analog conversion at the earliest possible point (as, for example, immediately following the camera tube or camera preamplifier) and to reconvert to analog just before the display function. Ideally, the signal would be both generated and displayed in digital (quantized) form, with the number of quantizing levels being selected to give the appearance of an analog display. It is therefore desirable to perform the flare correction and the associated APL determination in the digital domain.

In order to perform an APL measurement digitally in the same fashion in which the analog APL function is accomplished, it appears to be necessary to provide a field store having memory locations corresponding to the number of pixels per field or frame, to read the field store simultaneously with the present or current incoming pixel, add together the value of the current pixel and the stored value, and return the updated pixel to the field store to provide the weighted data, then add together the values of all the pixels and divide by the number of pixels averaged. This is an extremely large and complex circuit. The cost may be decreased by ignoring previous fields and merely adding together the values of all of the pixels of a field and dividing by the number of pixels, but even this circuit must add together the values of about one quarter-million pixels per field (assuming sampling of an NTSC signal at a rate of four times the color subcarrier frequency or 4×SC) and dividing by a like number.

It would be desirable to have a simple and convenient method of producing a digital signal representative of the APL for controlling a flare corrector and for other signal processing purposes.

SUMMARY OF THE INVENTION

A digital arrangement for averaging a plurality of digital words each of the words having a predetermined number of bits, includes a counter or counters, each of which is coupled to count the bits of a particular significance in or associated with the incoming words. The output of each counter is processed to produce the desired average.

DESCRIPTION OF THE INVENTION

Figure 1:
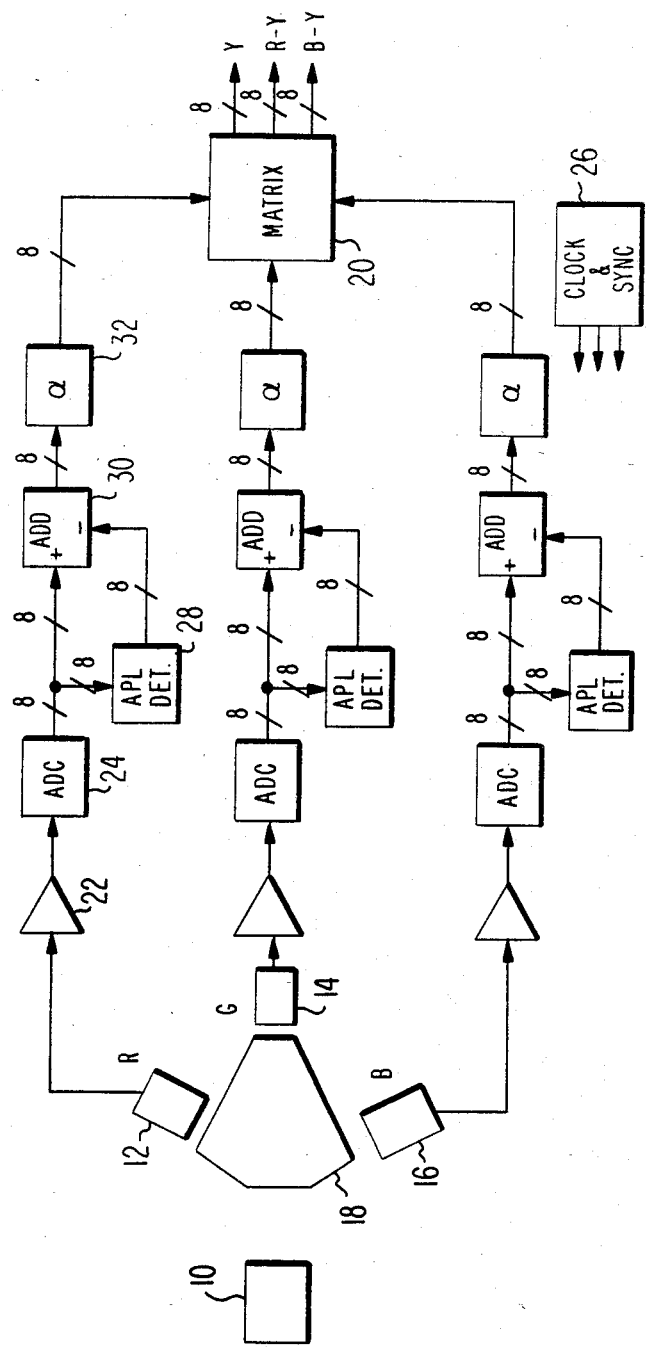
FIG. 1 illustrates in block diagram form a camera incorporating APL detectors and flare correction.

FIG. 1 illustrates a camera including a lens 10 for focussing an image (not shown) onto red (R), green (G), and blue (B) imagers 12, 14, and 16 respectively by way of a color-splitting prism 18. Each imager produces a signal representative of the image in response to raster-scan control (not shown), which signal may illustratively be line-scanned and amplitude-modulated, with white level more positive than black level. The signals from the three imagers flow through substantially identical channels to a matrix 20, in which the R, G and B-representative signals are matrixed to form Y, R-Y, B-Y signals. Since the channels are similar, only the red channel is discussed in detail.

The R signal from imager 12 is amplified by a preamplifier 22 and applied to an analog-to-digital converter (ADC) 24, in which the signal is quantized both in time and in amplitude. The time quantization may be at a clock rate of $4 \times 3.58$ MHz under the control of clock generator 26 in order to provide satisfactory definition and reduce the effects of beats in the signal if a standard NTSC signal is to be generated by a use apparatus (not shown). ADC 24 may also include an anti-alias prefilter for preventing aliasing. ADC 24 quantizes the amplitude of the signal applied thereto into $2^n$ levels, where n may for example be eight (8) thereby providing 256 discrete amplitude levels. Naturaly, more or fewer quantizing levels may be used as desired.

As previously mentioned, increases in the overall illumination level of the image results in "flare", or an increase in the apparent magnitude of the black-level value of the signal. The flare results from light which is internally reflected from the internal surfaces of the lenses and prism and or the internal black coatings of the mountings of the optical equipment. The internally reflected light suffuses the surface of the imager with unfocussed light to which the imager responds, thereby increasing the signal level resulting from scanning of a black portion of the image. Since the flare is a function of the overall illumination, it may be corrected by subtracting from the signal an amount determined by the average picture level (APL), which, in turn, is ordinarily determined by an integrator. The red channel includes an APL detector 28 coupled to the inverting input of an adding circuit 30. In effect, block 30 is a subtractor. The signal from adder 30 is applied to other signal processing circuits such as gamma corrector 32 before being applied to matrix 20. It is desirable to perform flare correction before nonlinear signal processing, because the operating point of the nonlinear processor will be perturbed by the effect of flare.

Figure 2:
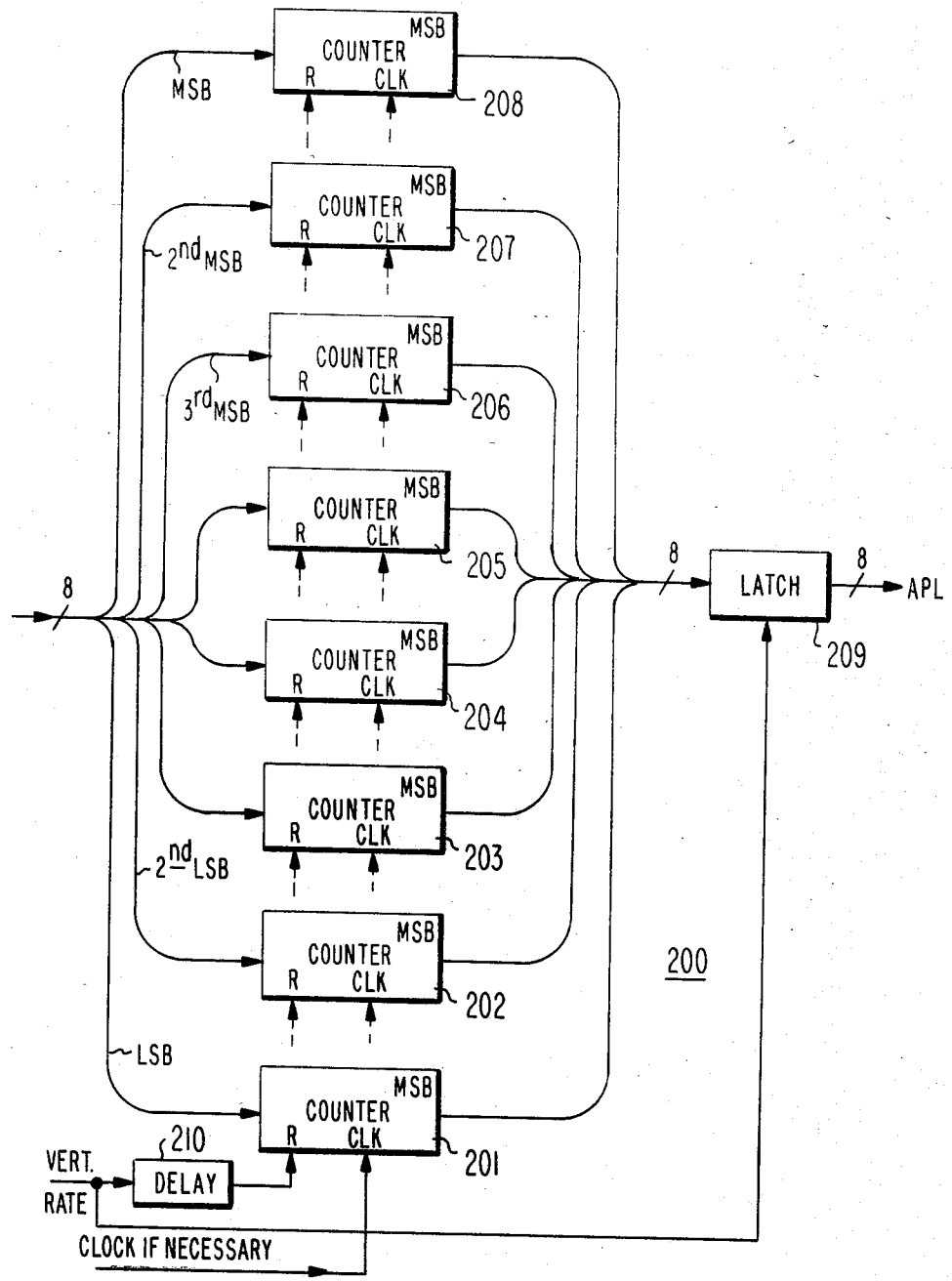
FIGS. 2–5 illustrate in block diagram form digital adding circuits according to the invention which may be used as an APL detector in the arrangement of FIG. 1.

FIG. 2 illustrates in block diagram form a digital adding circuit 200 according to the invention. Digital adder 200 may be used as an APL detector in the arrangement of FIG. 1. In FIG. 2, a number of binary counters 201-208 equal in number to the number of bits in the digital signal being processed (in this case an 8-bit signal is processed so eight counters are used) each has its input coupled to receive the serial stream of bits of one particular significance of the signals to be added. For example, counter 201 is coupled to receive and count the least-significant bits (LSB) of the input signal, counter 202 is coupled to receive the second-least significant bit (second LSB) while counters 208 and 207 are coupled to count the most-significant bit (MSB) and second-most-significant bit (second MSB), respectively. Other counters are coupled to count other bits. Each counter 201-208 has a reset input terminal coupled to receive a reset pulse which resets the set of counters each television field or at some other rate, as established by the requirements of the system. When reset at the beginning of each field, the counters begin to count the bits of their particular significance, and continue counting until the next following reset pulse. In order to avoid overflow, each counter must have a number of stages suitable for unambiguously counting the maximum number of bits which it may receive in the counting interval. For a digital television signal sampled at 14.318 MHz having a field rate of 59.94 Hz, the maximum count is about 240,000 bits. A binary counter with 18 stages is capable of counting to about 262,000 bits, so each counter 201-208 should have at least 18 stages. The counters may be asynchronous, i.e. clocked by the input signal, but in cases in which propagation delays are a problem the counters may be clocked as necessary. The output of each counter is the output of the highest-significant-stage of the counter, i.e. the 18th stage in the example. The output of each stage is coupled to an 8-bit latch 209 which latches the output signal of the counters in response to the vertical-rate signal. A delay 210 is coupled in the path between the vertical-rate reset source (not shown) and the reset inputs of the counters, thereby guaranteeing that latch 209 latches the count before the counters 201-208 are reset in preparation for the next counting interval.

In operation, each counter counts its bits during a vertical field. When half the maximum count of each counter has been counted, the MSB binary stage toggles to produce a binary 1 or logic HIGH at its output. It is easy to see that for a white field, all incoming bits will be a logic 1 and each counter will count to the maximum value; therefore the MS stage of each counter will have toggled near the middle of the field, providing latch 209 with a digital word 11111111 representative of a white field. Similarly, a black field will result in each counter receiving all-zeroes, no count whatever is registered over the entire field, and the digital word latched at the end of the field will be 00000000, representative of a black field. For an average video picture, the arrangement of FIG. 2 will provide an approximation of the correct APL. However, under certain special video conditions substantial inaccuracy may result. For example, if the video represents a raster having a grey level approximately equal to ½ of full amplitude and extending over 48% of the raster, and black elsewhere, the stream of bits will include 10000000 48% of the time and 00000000 for the remainder (52%) of the time; consequently, only MSB counter 208 will count, and it will count for less than half the time, and therefore the MS stage of counter 208 will not toggle. Under this special circumstance, the output word will be 00000000, which is not a correct representation of the actual APL;

$$0.5 \text{ luminance} \times 0.48 \text{ time} = 0.24, \qquad (1)$$

which would be represented by the 2-bit digital word 00111101 or 00111110, depending upon rounding.

Similarly, errors occur for full brightness (which results in all counters counting) if the full brightness lasts for less than 50% of the time, since no counter will reach a sufficient count to toggle the MS stage.

Figures 3, 4:
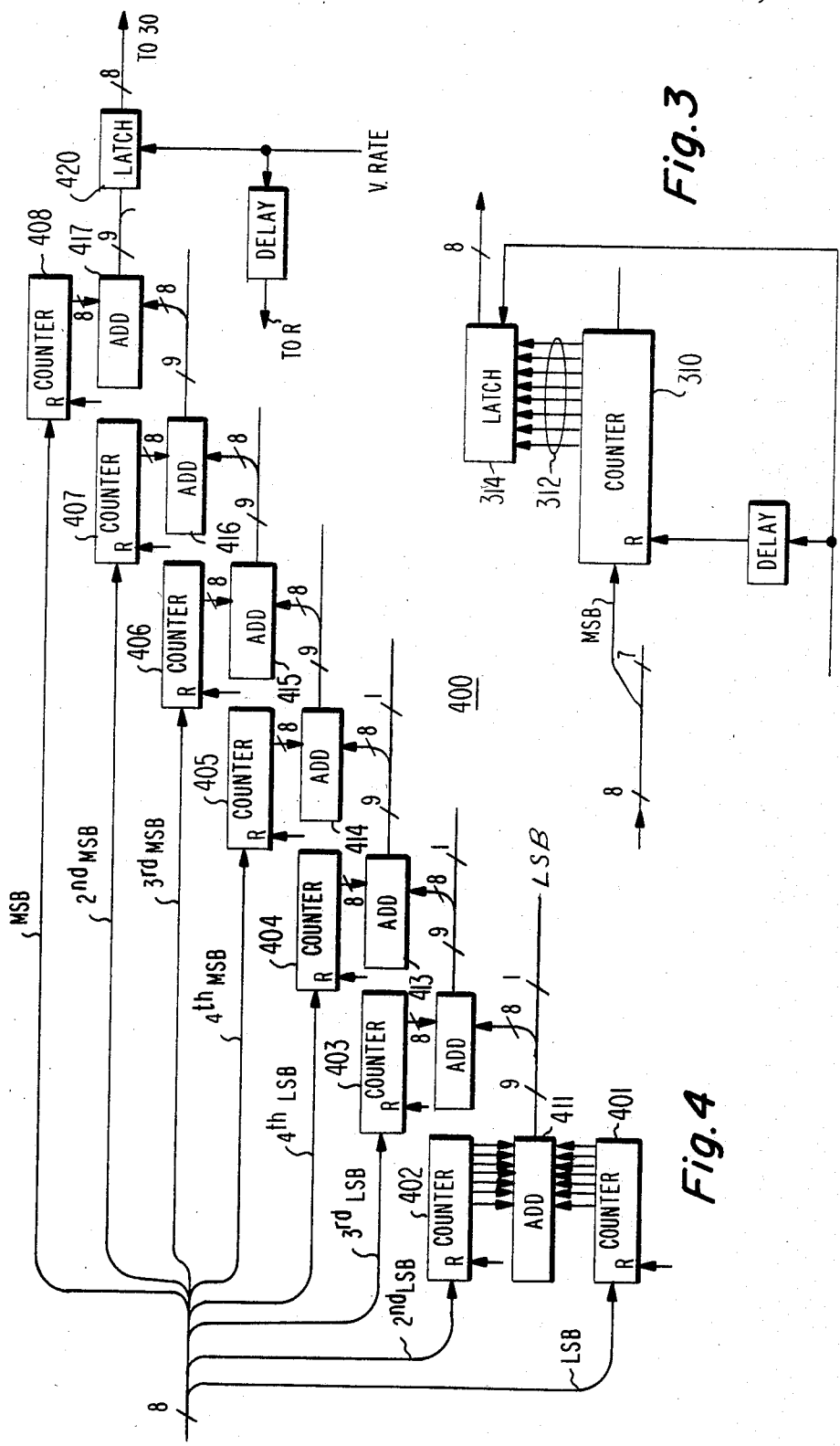

Greater accuracy of coverage is obtained with the arrangement of FIG. 3, in which an 18-stage counter 310 is coupled to count the MSB of the input signal. The remaining seven LSB input lines are unterminated and are not counted. The eight most-significant stages of counter 310 are coupled by conductors 312 to an 8-bit latch 314. Latch 314 is set by vertical-rate pulses as in FIG. 2, while counter 310 is reset by delayed vertical pulses. In operation, any digital input word having a value exceeding 128 quantizing levels has a MSB HIGH, while any value of 127 or less has a MSB value of zero. Thus, if the MSB value is HIGH, counter 310 counts. For the example given, the least-significant counting stage is the 11th counting stage, which corresponds to a count of 512, or about 2/1000 of a full count of the counter. Put another way, a aster having only 512 words having a value of mid-scale grey or whiter will produce an output signal. In effect, using 8 counter stages as outputs allows refining the area error from 1:2 (approximately 49% to 51%) or 6 dB as in the embodiment of FIG. 2 to 1:256, which is a negligible error of about $$20 \log_{10}(1 + 1/256) = 0.034 \text{ dB} \quad (2)$$

However, in the embodiment of FIG. 3, a signal level representative of slightly less than 128 quantizing levels over the entire raster will have no word containing the MSB, so will never result in a count, because counter 310 is coupled only to the MSB. This results in about a 2:1 (6 dB), amplitude (as opposed to area) quantizing error under certain input signal conditions.

The arrangement of FIG. 4 includes counters 401–408 coupled to receive and count each of the bits of the incoming stream of words. As in the arrangements of FIGS. 2 and 3, the counters may by asynchronous or clocked. Counter 401 is coupled to receive and count the LSB of the input words, and counter 402 receives the second LSB. Each two bits counted by counter 401 has a value equal to one bit counted by counter 402. The 8 MS, stages of counters 401 and 402 are coupled to an adder 411, which sums together corresponding values to produce a 9-bit output signal representing the sum of the 8 MS counts of counter 401 and 402. The LSB of the 9-bit output is discarded and the 8 MSB are coupled to one set of input terminals of a further adder 412. A second set of input terminals of adder 412 receive outputs from the 8 MS stages of counter 403, which counts the 3rd LSB of the input signal. Similarly, adders 413–417 receive 8-bit MSB input signals from the 9-bit outputs of the adder having the next lower significance, and 8-bit inputs from the MS stages of a counter. The first or LS adder 411 receives input signals from two counters, while 6 further adders 412–417 each receive inputs from one adder of less significance and from one counter. The least-significant bit of each adder output is discarded, and the eight most-significant outputs of most-significant adder 417 are coupled to 8-bit latch 420, which is operated by the vertical-rate pulse. The vertical-rate pulse also resets counters 401–408 by way of a delay 422. The output of latch 420 is representative of the sum of the word values of the raster over the entire raster.

Figure 5:
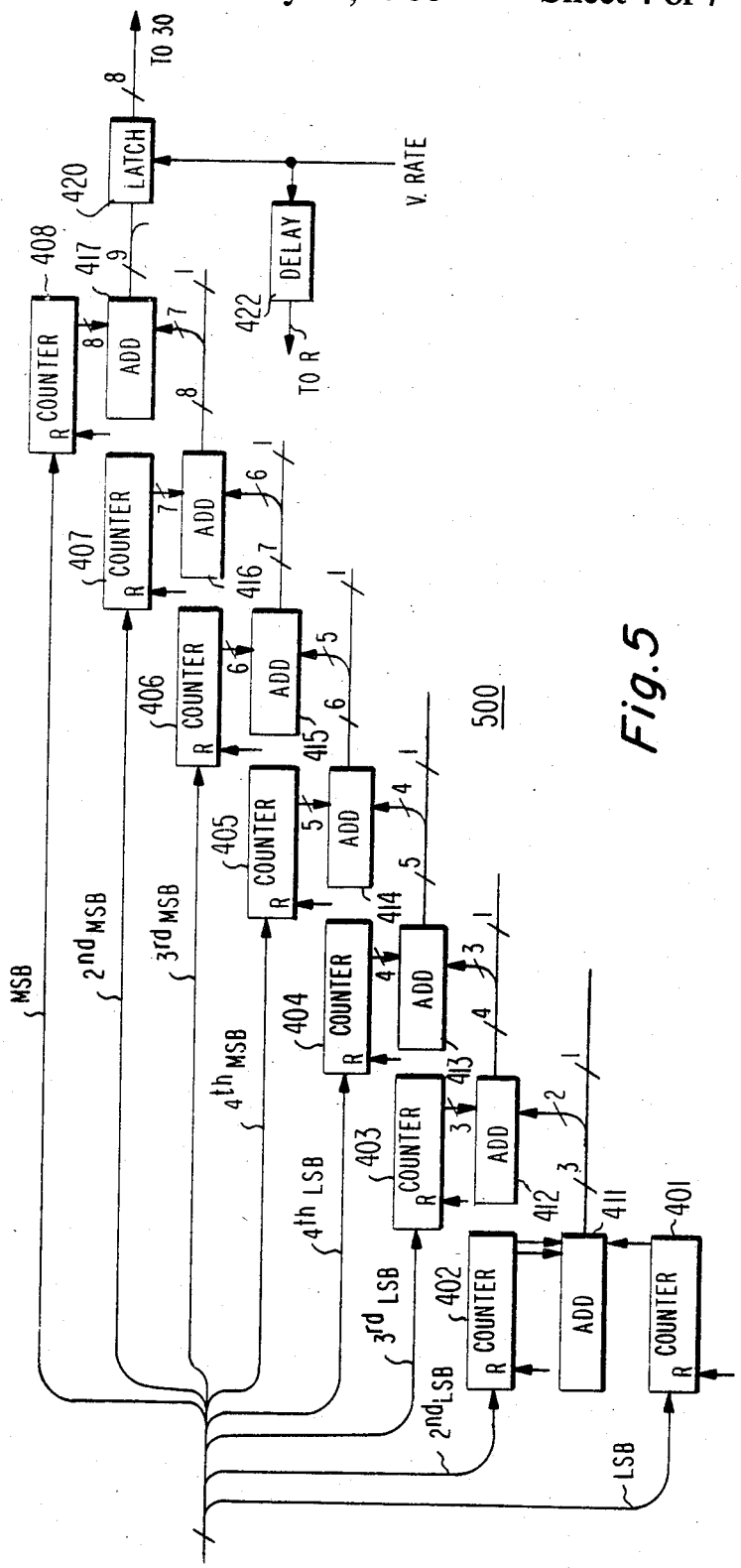

In operation, a complete raster-full of least-significant bits fills the most-significant stages of counter 401 with logic HIGH levels, which in the absence of other counter counts corresponds to a count in the LS stage of MS counter 408. Adder 411 produces an output signal of 01111111, adder 412 produces 0011 1111, and each successive adder drops, effectively shifts, the significance of the values towards less-significant values, so that a logic 1 in the MS stage of counter 401 produces a logic 1 in LSB of adder 417. Consequently, for the example or a raster-full of signals representing a LSB, a LSB output is produced from adder 417 and latch 420. In fact, only slightly more than a half-raster of LSB signals will produce a LSB output signal from adder 417, because the MS stage of counter 401 is toggled at a count of $2^{17}$ or 131,072. From this discussion, it is apparent that the 7 LS outputs or stages of counter 401 do not contribute significantly to the output, and so may be eliminated, as may the lesser 6 stages of counter 402, the lesser 5 stages of counter 403, lesser 4 stages of counter 404, 3 of counter 405, 2 of 407 and 1 of 408, producing a configuration illustrated in FIG. 5.

Theoretically, the APL over a field may have a very large number of values, approximately 67 million. Representing this large number of possible values by 8 bits reduces the number of possible representations to 256, or in effect quantizes the almost-continuous range of values of the APL into discrete values. Eight-bits representing 256 (or more exactly, 255) levels is sufficiently fine quantization to reduce the APL-derived field-to-field variations to 0.034 dB, which is quite imperceptible. This APL quantization to 8 bits is also quite rational, considering that the least significant change to the digital signal level under control of the APL is also the LSB of 8 bits, or 1/255 of the signal level. Depending on the application, the APL representation may be by fewer or greater number of bits. If the representation is to be by a fewer number of bits, the least-significant counter may be eliminated. This improves efficiency, since counter 401 of FIG. 5 contains 18 binary counting stages only one of which is utilized in forming the output signal.

Figure 6:
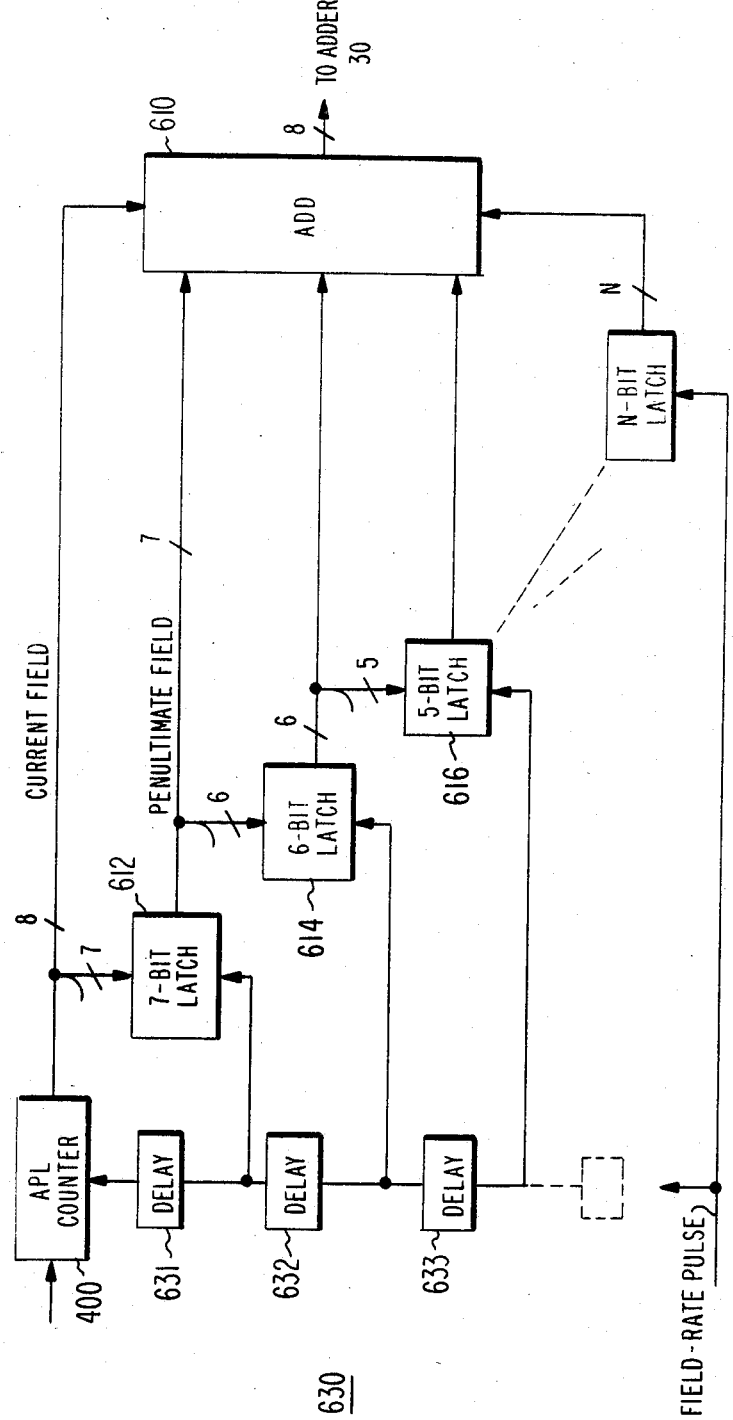
FIGS. 6 and 7 illustrate in block diagram form arrangements for producing an adder for block-synchronized signals in which the values of the sum signal from previous blocks or fields contribute to the value of the output signal.

The arrangements of FIGS. 2–5 produce field-by-field APL-representative signals. Such signals may change instantaneously when a scene changes, which is an advantage over the analog equivalent circuit for certain purposes. However, when a scene contains highlights which occur suddenly and then vanish, it may be disadvantageous to have the APL-representative signal change on a field-by-field basis. FIG. 6 illustrates an arrangement in which the APL value includes portions dependent upon the values of APL of previous fields. In FIG. 6, APL counter 400 of FIG. 4 is illustrated as block 400, which produces an APL signal representative of the "current" field. The current field for this purpose is the last field for which an APL has been established, i.e. the last *complete* field. The 8-bit value of the APL for the current field is applied to an input of adder 610, and also the seven MSB are split off and applied to the input of a seven-bit latch 612. Latch 612 is operated slightly before counter 400 by virtue of a string 630 of delays 631; 632 . . . which cause sequential latching. Thus, latch 612 latches the value of the current field before APL counter 400 is clocked to produce a new value of current field, thereby relegating the 7-bit value held by latch 612 to the status of penultimat field. Similarly, on the next field-rate clocking pulse, 6-bit 614 latch siezes the value of the penultimate-field APL to produce a 6-bit value representing the antepenultimate field. The outputs of the latches are applied to inputs of adder 610, with the APL of older stored fields being effectively right-shifted (shifted towards a lower significance or divided-by-two) before addition. Consequently, the current APL value is summed with half the value of the APL of the penultimate field, one-quarter the value of the antepenultimate field, and $\frac{1}{2}^M$ times the value of the APL of the $M^{th}$ oldest field. This is a fairly rapid decay of importance, the value of a 3rd field being $\frac{1}{8}$ and a 4th field 1/16, which is not too significant an addition to the current value. It may be desirable to multiply by some value other than $\frac{1}{2}$ for each successive field, and this can be accomplished by multipliers of conventional types rather than by discarding bits and right-shifting.

Figure 7:
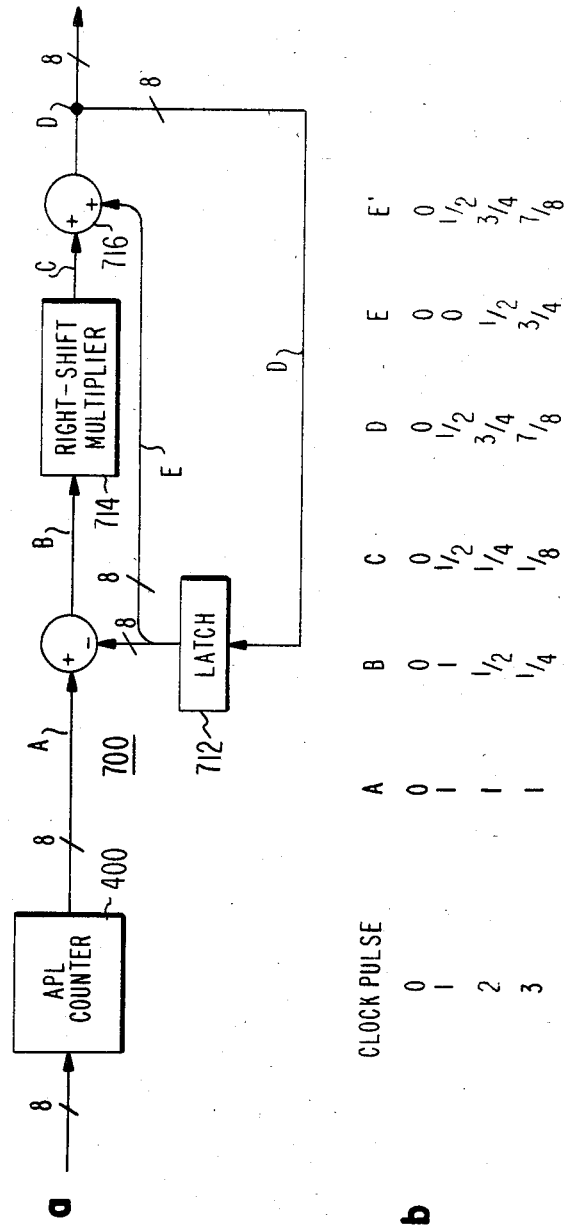

FIG. 7 illustrates a regressive scheme 700 for forming a signal representation of the APL level of more than one field. In FIG. 7a, APL counter 400 produces at the time of the end of each field an 8-bit signal which is coupled over 8-bit conductor A to a noninverting input terminal of a summer 710 which also receives at an inverting input terminal the 8-bit output signal from a latch 712 by way of a conductor E. The difference signal formed by summer 710 is carried over a conductor B to a right-shift multiplier 714 arranged for divide-amplitude-by-two operation. Multiplier 714 may simply be a hard-wired arrangement which discards the LSB and makes the MSB the second MSB to divide amplitude by 2. The divided signal is applied over conductors C to a second summer 716 which sums together the signal from latch 712 and from multiplier 714. The output of averager 700 appears on conductor D at the output of summer 716, which output is also applied to the input of latch 717.

In operation, the system is clocked at the vertical rate, and the output signal approaches the input signal asymptotically. In the table of FIG. 7b, the values on each conductor are listed for various clock pulses. At zero clock pulses and before, the input signal is zero and the system is cleared. The columns E, E' represent the value on conductor E immediately before and immediately after the clock pulse, respectively. During the first clock pulse, the input steps to a digital value representing full-scale, which is tabulated in decimal form as 1.0 for simplicity, although the actual value is 11111111. The sum of 1, and 0 on conductor B is 1, and divided-by-two appears as $\frac{1}{2}$ on conductor C. Adder 716 adds $\frac{1}{2}$ with 0 from latch 712 to produce $\frac{1}{2}$ on conductor D. At the beginning of the clock pulse conductor E has a value of 0, and at the end it has a value of $\frac{1}{2}$. Thus, the output signal steps from 0 half-way to the instantaneous value of the input signal during the first clock pulse, as suggested by the analog equivalent waveform of FIG. 7C. During the next clock pulse, the difference on conductor B is $\frac{1}{2}$, and the value on C is $\frac{1}{4}$, on D is $\frac{3}{4}$, E before is $\frac{1}{2}$, after is $\frac{3}{4}$. Thus, it can be seen that the output on the second clock pulse again steps $\frac{1}{2}$-way between the output value and the input value. This process continues to produce a long-term average much as in FIG. 6.

Figure 8:
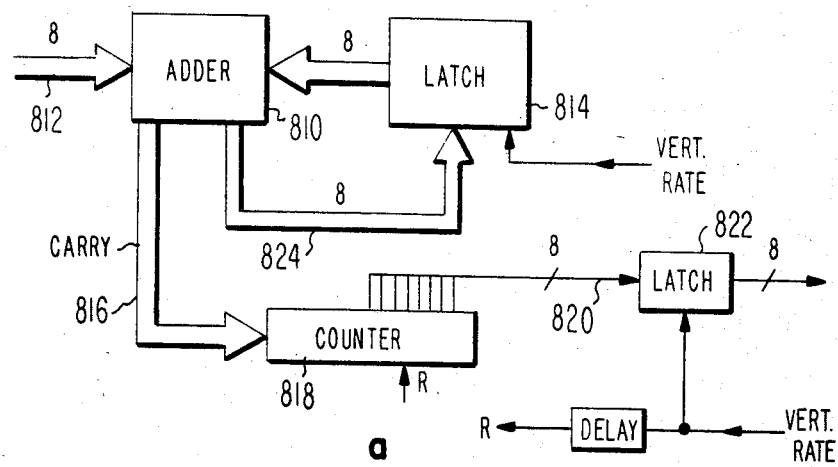
FIG. 8 is a block diagram of another embodiment of the invention.
Figure 8:
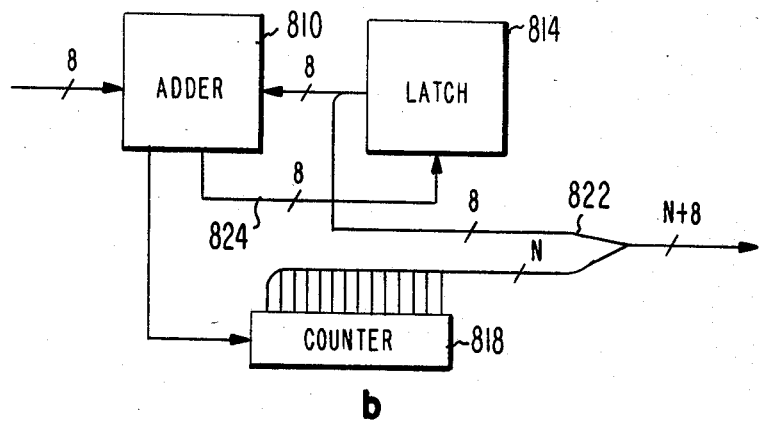

FIG. 8 illustrates embodiments of the invention in which the counter is coupled to receive MSB equivalent values. In FIG. 8a, an adder 810 receives at a first input port a stream of 8-bit words over a concuctor set 812, and adds the value of each word to the value of a corresponding word received from a latch 814. Latch 814 receives at its input port the sum value produced by adder 810. A carry or overflow output terminal of adder 810 is coupled by a conductor 816 to a counter 818. A plurality (eight, in this example) of the MS stages of counter 818 are coupled to a latch 822 via an output conductor 820. Latches 814 and 822, counter 818 and/or adder 810 may be clocked as required. In operation, adder 810 adds the 8-bit input signal to the last sum. If a stream consisting only of LSB is applied to the input terminals of adder 810, the adder and latch will cycle about 256 times before adder 810 produces a pulse on the CARRY output; whereas if a stream of words representing white is arriving, adder 810 will produce a carry for every word, because the adder will fill with every word. Generally, there will be a remainder in adder 810 after each operation. Counter 818 counts carry pulses, and therefore tabulates the number of full-white equivalent words which correspond to the actual picture level. For example, if the incoming words each have a value of 256/4 (i.e., one-quarter amplitude), a carry pulse will be produced by adder 810 and counted by counter 818 every fourth clock count, which can be interpreted to mean that four quarter-amplitude-representative words are equivalent to one full-value word. The 8 MS stages of counter 818 therefore represent to 8-bit accuracy the APL of the picture. The counter and adder may be periodically reset to zero after their outputs are latched each counting interval, as described supra in FIG. 2. Since it is possible to have a carry pulse for every incoming word, counter 818 must have about 18 stages for a field-rate APL detector operating on NTSC signals sampled at 4×SC.

There are two sources of inaccuracy in the output signal produced by the arrangement of FIG. 8a; rounding error and remainder error. The rounding error results from not including in the output signal portions derived from those stages of counter 818 having lesser significance, while the remainder results from the count remaining in adder 810 at the time that the output signal is coupled to a utilizing means. FIG. 8b illustrates an arrangement for reducing these sources of error. In FIG. 8b, elements corresponding to those of FIG. 8a are designated by the same reference numbers. The rounding error is reduced by taking an output in parallel from each of the stages of counter 818; the number of stages as illustrated is N. The remainder error is reduced by combining the 8-bit output of latch 814 with the N-bit output of 818. Thus, the remainder shows up in the LS portion of the output signal. The LS portion of the output signal may instead be taken from output conductors 824 of adder 810; rather than from conductor 822. Adder 810 may have any desired capacity other than 8-bits; as for example 9 bits, in which case fewer counter stages may be required.

Other embodiments of the invention will be apparent to those skilled in the art. For example, the sum or APL value as established may be scaled by a constant by the use of a ROM or multiplier. The camera may use a single APL detector coupled to the green channel to sense the APL which may then be used to control all the channels of the camera. The APL value may also be used to control an iris or other light control. Naturally, not all bits of the video signal need be included in the evaluation of the sum value or APL. Signal amplitude quantization may be by other than 8 bits and the time quantization of the bits is a mere matter of design choice.

What is claimed is:

1. A digital signal averaging arrangement comprising:
 a first plurality of binary counting means equal in number to the number of bits in each word of the digital signal to be averaged, each of said counting means having its input coupled for receiving bits of a particular significance of said digital signal, each of said counting means including a plurality of output terminals derived from particular counting stages;

first digital adding means coupled to said plurality of output terminals of that counting means coupled for counting the least-significant bit of said digital signal and coupled to said output terminals of that counting means coupled for counting the second-least-significant bit for adding together the signals appearing at said output terminals of said least-significant and second-least significant counting means;

a second plurality of digital adding means equal to two less than the total number of said first plurality of counting means, each of said second plurality of digital adding means of a particular significance being coupled to receive as an input the output of the next lower significance digital adding means, and also coupled to the output of a counting means of a like significance; and coupling means coupled to the output of that digital adding means having the highest significance for extracting therefrom a signal representative of the average value of said digital signal.

2. An averaging arrangement according to claim 1 further comprising timing means coupled to said counting means for establishing the beginning of the averaging interval by resetting said counting means.

3. An averaging arrangement according to claim 2 wherein said coupling means further comprises latching means coupled to said timing means for latching the average value before said counting means are reset.

4. An averaging arrangement according to claim 3 wherein said digital signal is derived from a source fo television signals, and said timing means comprises a source of vertical synchronizing signals for resetting said counting means during the vertical blanking interval of said television signals.

5. An averaging arrangement according to claim 4 wherein the source of said television signals comprises a lens and imaging means subject to flare, and further comprising flare correction means coupled to said averaging arrangement for correcting said flare in response to the average level of said digital signal.

6. An averaging arrangement according to claim 1 wherein said first plurality is eight and said second plurality in six whereby the total number of said digital adding means equals said second plurality of six plus said first digital adding means for a total of seven digital adding means.

7. An averaging arrangement according to claim 1 wherein each of said adding means is coupled to a predetermined number of said plurality of output terminals of its corresponding counting means, wherein for each of said corresponding counting means said predetermined number is equal in number to the significance of its input bit, said least-significant input bit corresponding to a predetermined number of one.

8. An adder for generating a signal representative of an average of a block-synchronized stream of digital N-bit signals, comprising:

counting means having an input coupled to receive bits corresponding to bits of selected significance from a source of said digital N-bit signals for counting said bits and an output for providing output signals representative of said counting;

latch means having an input coupled to receive said output signals of said counting means and an output; and resetting means coupled to said latch means and to said counting means for causing said latch means to latch said output signals when a full synchronizing block interval has expired and for resetting said counting means before the beginning of the next block of digital N-bit signals to be added, thereby causing said average representative signal to be generated at said latch means output.

9. An adder according to claim 8 wherein said counting means comprises a cascade of binary counting stages and said latch means has inputs coupled to receive output signals from a plurality of said binary counting stages.

10. An adder according to claim 9 wherein said plurality includes the most significant counting stages of said counting means.

11. An adder according to claim 8 wherein said counting means comprises a plurality of counters, each coupled to receive respective ones of a like plurality of bits of particular significance from said source for generating partial signals representing the sum of the number of bits of each particular significance in the stream of signals.

12. An adder according to claim 11 wherein said latch means is coupled to receive and hold each of said partial signals from each of said plurality of counters.

13. An adder according to claim 12 wherein each of said counters comprises a cascade of binary counting stages, and wherein said latch is coupled to receive signals from at least the most-significant counter stage of each counter.

14. An adder according to claim 8 wherein said counting means comprises a plurality of counters, each of which is coupled to count bits from respective ones of a like plurality of bits of particular significance of said digital N-bit signals, and further comprising:

summing means coupled to outputs of said counters for summing the outputs of said counters with appropriate significance to form said output signals representative of said counting.

15. An adder according to claim 14 wherein said summing means comprises a first summer coupled to the outputs of those two counters having the least significance for producing a more significant sum; and further summing means coupled to receive said more significant sum from said first summer and for summing said more significant sum further output signals from counters of said counting means other than said two counters having the least significance for generating said output signals representative of said counting.

16. An adder according to claim 8 further comprising:

further latching means coupled to the output of said first-mentioned latch means and to said resetting means for successively latching said average representative signal to form delayed average representative signals; and weighted adding means coupled to said first-mentioned latch means and to said further latching means for receiving said average representative signal and said delayed average representative signals and for adding the values thereof with weights related to the amount of delay of said delayed average representative signals relative to said average representative signal.

17. An adder according to claim 9 wherein said counting means has its input coupled to receive the most-significant bit from said source of digital N-bit signals.

18. An arrangement for generating a signal representative of an average of a block-synchronized stream of digital words, comprising:

adding means having first and second inputs and an output, said first input coupled to receive said digital words and said second input coupled to receive signal from said output, said adding means also having a carry output terminal at which a carry output pulse appears each time said adding means overflows;

counting means having an input coupled to said carry output terminal for counting said carry output pulses and having an output for providing output signals representative of said counting;

a latch having an input coupled to receive said counting means output signals and an output for supplying said average representative signal; and resetting means coupled to said latch and to said counting means for latching said counting means output signals when a full sychronizing block interval has expired and for resetting said counting means before the beginning of the next block of words to be averaged.

19. An adder according to claim 18 wherein said counting means comprises a cascade of binary counting stages and said counting means output signals are derived from less than all the stages of said counting means.

20. An adder according to claim 18 wherein said latch input is also coupled to receive signals derived from an output of said adding means.

* * * * *